(12) United States Patent (10) Patent No.: US 7,834,816 B2
Marino et al. (45) Date of Patent: Nov. 16, 2010

(54) APPARATUS FOR AND METHOD OF USING A DIVERSITY ANTENNA

(75) Inventors: Ronald A. Marino, Jackson, NJ (US); Richard J. Campero, San Clemente, CA (US); William J. Carpenter, Sykesville, MD (US)

(73) Assignee: Sensormatic Electronics LLC, Baca Raton, FL (US)

( * ) Notice: Subject to any disclaimer, the term of this patent is extended or adjusted under 35 U.S.C. 154(b) by 962 days.

(21) Appl. No.: 10/562,058

(22) PCT Filed: Jul. 23, 2004
(Under 37 CFR 1.47)

(86) PCT No.: PCT/US2004/023704

§ 371 (c)(1),
(2), (4) Date: Jan. 29, 2007

(87) PCT Pub. No.: WO2005/013496

PCT Pub. Date: Feb. 10, 2005

(65) Prior Publication Data

US 2007/0257857 A1 Nov. 8, 2007

Related U.S. Application Data

(60) Provisional application No. 60/489,934, filed on Jul. 25, 2003.

(51) Int. Cl.
*H01Q 21/00* (2006.01)
(52) U.S. Cl. .................. 343/867; 343/866; 343/702; 343/742

(58) Field of Classification Search .................. None
See application file for complete search history.

(56) References Cited

U.S. PATENT DOCUMENTS

| 2,127,088 | A | 8/1938 | Percival et al. |
| 2,167,709 | A | 8/1939 | Cork et al. |
| 2,187,014 | A | 1/1940 | Buschbeck et al. |
| 2,615,134 | A | 10/1952 | Carter |
| 2,972,145 | A | 2/1961 | Watts, Jr. |

(Continued)

OTHER PUBLICATIONS

Wilmar K. Roberts, "A New Wide-Band Balun", Proc. IRE, vol. 45 pp. 1628-1631; Dec. 1957.

(Continued)

*Primary Examiner*—Trinh V Dinh
(74) *Attorney, Agent, or Firm*—Pillsbury Winthrop Shaw Pittman LLP

(57) ABSTRACT

In accordance with a preferred embodiment of the invention, an antenna structure is provided having one or more antennae arranged so as to read all possible orientations of a randomly placed tag. Also provided in accordance with a preferred embodiment of the invention, is a method of configuring one or more antennae composed of the steps of: identifying the "dead zones" of each discrete antennae used, and orienting each antennae such that there are no "dead zones" common to all antennae. The unique antenna structure (and corresponding method) has particular application in tag reader antenna systems for use in RFID (radio frequency identification) applications (13.56 MHz) and the like. In accordance with an exemplary embodiment, multiple RF (radio frequency) antennae are utilized as part of an intelligent station to track items tagged with radio frequency identification (RFID) tags.

9 Claims, 16 Drawing Sheets

U.S. PATENT DOCUMENTS

| | | |
|---|---|---|
| 3,588,905 A | 6/1971 | Dunlavy, Jr. |
| 3,902,177 A | 8/1975 | Mori et al. |
| 4,135,183 A | 1/1979 | Heltemes |
| 4,694,255 A | 9/1987 | Hayes |
| 4,847,626 A | 7/1989 | Kahler et al. |
| 5,068,672 A | 11/1991 | Onnigian et al. |
| 5,208,534 A | 5/1993 | Okamoto et al. |
| 5,256,971 A | 10/1993 | Boskamp |
| 5,370,118 A | 12/1994 | Vij et al. |
| 5,389,880 A | 2/1995 | Mori |
| 5,394,087 A | 2/1995 | Molyneaux |
| 5,539,394 A | 7/1996 | Cato et al. |
| 5,548,218 A | 8/1996 | Lu |
| 5,682,098 A | 10/1997 | Vij |
| 6,069,564 A | 5/2000 | Hatano et al. |
| 6,137,447 A * | 10/2000 | Saitoh et al. ............... 343/742 |
| 6,392,544 B1 | 5/2002 | Collins et al. |
| 6,456,246 B2 | 9/2002 | Saito |
| 6,700,547 B2 | 3/2004 | Mejia et al. |
| 6,714,121 B1 | 3/2004 | Moore |
| 6,720,930 B2 | 4/2004 | Johnson et al. |
| 6,903,656 B1 | 6/2005 | Lee |
| 6,924,777 B2 * | 8/2005 | Reasoner et al. ............ 343/866 |
| 6,943,688 B2 * | 9/2005 | Chung et al. ............. 340/572.7 |
| 6,960,984 B1 * | 11/2005 | Vicci et al. .................. 343/742 |
| 2004/0227682 A1 * | 11/2004 | Anderson .................. 343/742 |
| 2008/0117118 A1 * | 5/2008 | Hino et al. .................. 343/866 |

OTHER PUBLICATIONS

R. Bawer and J.J. Wolfe, "A Printed Circuit Balun for Use with Spiral antennas", IRE Transactions on Microwave Theory and Techniques, vol. MIT-8, pp. 319-325; May 1960.

Feig Electronic, GmbH, "Reader and Antenna Training", pp. 41-42, Jul. 2003.

* cited by examiner

Reader Antenna in X-Y Plane,
Tag in Plane Orthogonal to X-Y Plane

APPARATUS FOR AND METHOD OF USING A DIVERSITY ANTENNA

This application claims the benefit of U.S. Provisional Patent Application 60/489,934 ('934 application) filed Jul. 25, 2003. This application relates to U.S. patent application Ser. No. 10/338,892 ('892 application), filed Jan. 9, 2003, and U.S. patent application Ser. No. 10/348,941 ('941 application), filed Jan. 23, 2003, where the '892 application claims the benefit of U.S. Provisional Application Nos. 60/346,388 ('388 application), filed Jan. 9, 2002, and 60/350,023 ('023 application), filed Jan. 23, 2002, where the '941 application is a continuation-in-part of the '892 application and claims the benefit of the '023 application. This application further relates to U.S. Provisional Application Nos. 60/466,721 ('721 application), filed May 1, 2003, 60/469,024 ('024 application), filed May 9, 2003, 60/479,158 ('158 application), filed Jun. 18, 2003, and 60/679,846 ('846 application), filed Jun. 20, 2003, and PCT Application Nos. PCT/US/04/13195 (PCT '195), filed Apr. 29, 2004, PCT/US04/12354 (PCT '354), filed Jun. 18, 2004, and PCT/US04/14396 (PCT '396), filed May 7, 2004. The disclosure of each of the '934, '892, '941, '388, '023, '721, '024, '158, '846, PCT '195, PCT '354, and PCT '396, applications is expressly incorporated herein by reference in their respective entireties.

BACKGROUND

Radio frequency identification (RFID) systems typically use one or more reader antennae to send radio frequency (RF) signals to items tagged with RFID tags. The use of such RFID tags to identify an item or person is well known in the art. In response to the radio frequency (RF) signals from a reader antenna, the RFID tags, when excited, produce a disturbance in the magnetic field (or electric field) that is detected by the reader antenna. Typically, such tags are passive tags that are excited or resonate in response to the RF signal from a reader antenna when the tags are within the detection range of the reader antenna.

The detection range of the RFID systems is typically limited by signal strength to short ranges, for example, frequently less than about one foot for 13.56 MHz systems. Therefore, portable reader units may be moved past a group of tagged items in order to detect all the tagged items, particularly where the tagged items are stored in a space significantly greater than the detection range of a stationary or fixed single reader antenna. Alternately, a large reader antenna with sufficient power and range to detect a larger number of tagged items may be used. However, such an antenna may be unwieldy and may increase the range of the radiated power beyond allowable limits. Furthermore, these reader antennae are often located in stores or other locations where space is at a premium and it is expensive and inconvenient to use such large reader antennae. In another possible solution, multiple small antennae may be used but such a configuration may be awkward to set up when space is at a premium and when wiring is preferred or required to be hidden.

Current RFID reader antennas are designed so that a maximum read range may be maintained between the antenna and associated tags, without running afoul of FCC limitations on radiated emissions. Often times, when tagged items are stacked, the read range of an antenna is impeded due to "masking" that occurs through the stacking. As a result, the masking limits the number of tags that an antenna may read through, and consequently affects the number of products that may be read. Furthermore, due to FCC limitations on radiated emissions, the reader antenna sizes cannot be adjusted to resolve such problems.

Resonant loop reader antenna systems are currently utilized in RFID applications, where numerous reader antennas are connected to a single reader. Each reader antenna may have its own tuning circuit that is used to match to the systems characteristic impedance. Multiple antennae (or components) may require the use of multiple transmission cables to connect a reader unit to the multiple antennae and/or to individually control the multiple antennae when they are all connected by a single transmission cable to the reader unit.

RFID applications incorporating random placement of a product may result in formation of "dead zones" for orientations in which the tag and reader antenna are in orthogonal planes. Dead zones are areas (dependent upon tag/reader antenna orientation) in which the level of coupling between the reader antenna and tag is not adequate for the system to perform a successful read of the tag. Thus, products placed in dead zones may not be detected resulting in potentially inaccurate tracking of tagged products.

SUMMARY

In accordance with a preferred embodiment of the invention, an antenna structure is provided having one or more antennae arranged so as to read all possible orientations of a randomly placed tag. Also provided in accordance with a preferred embodiment of the invention is a method of configuring one or more antennae composed of the steps of: identifying the "dead zones" of each discrete antennae used, and orienting each antennae such that there are no "dead zones" common to all antennae. The unique antenna structure (and corresponding method) has particular application in tag reader antenna systems for use in RFID (radio frequency identification) applications (13.56 MHz) and the like. In accordance with an exemplary embodiment, multiple RF (radio frequency) antennae are utilized as part of an intelligent station to track items tagged with radio frequency identification (RFID) tags.

DETAILED DESCRIPTION

Preferred embodiments and applications of the invention will now be described. Other embodiments may be realized and changes may be made to the disclosed embodiments without departing from the spirit or scope of the invention. Although the preferred embodiments disclosed herein have been particularly described as applied to the field of RFID systems, it should be readily apparent that the invention may be embodied in any technology having the same or similar problems.

Figure 1:
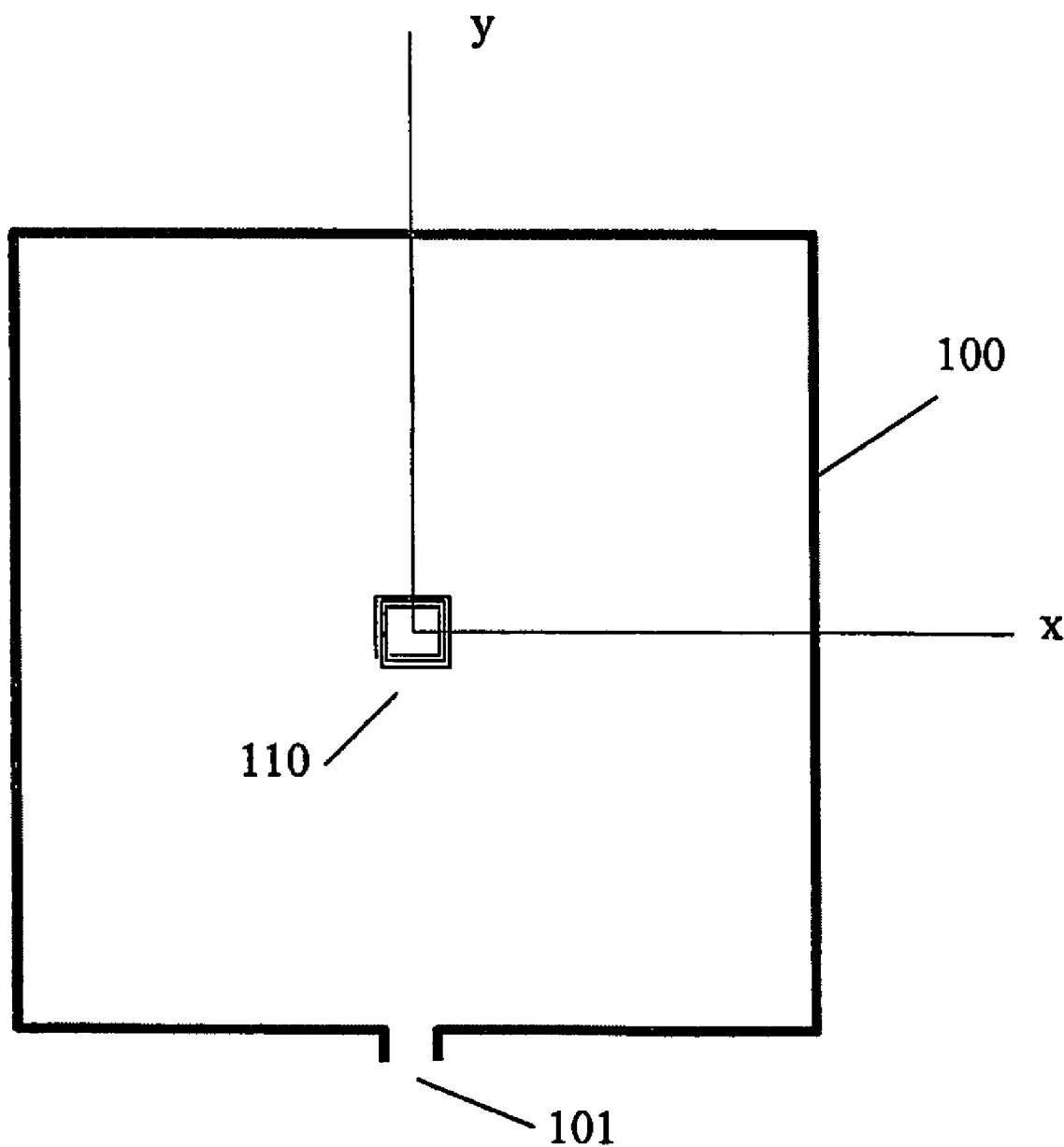
FIG. 1 illustrates an RFID reader antenna and tag oriented for optimal performance.

FIG. 1 shows an ideal orientation in which the plane of a reader antenna 100 is parallel to the X-Y plane, and an RFID tag 110 is also parallel to the X-Y plane. The reader antenna 100 and the RFID tag 110 are thus parallel to each other. The reader antenna 100 has a feed point 101 that would be connected to circuitry such as tuning components, switching components, and an RFID reader (not shown here but described in previously referenced applications). Having RFID tag 110 parallel to reader antenna 100 generally allows for good RF coupling between the tag and reader antenna so that the tag may be read by the reader antenna.

Figure 2:
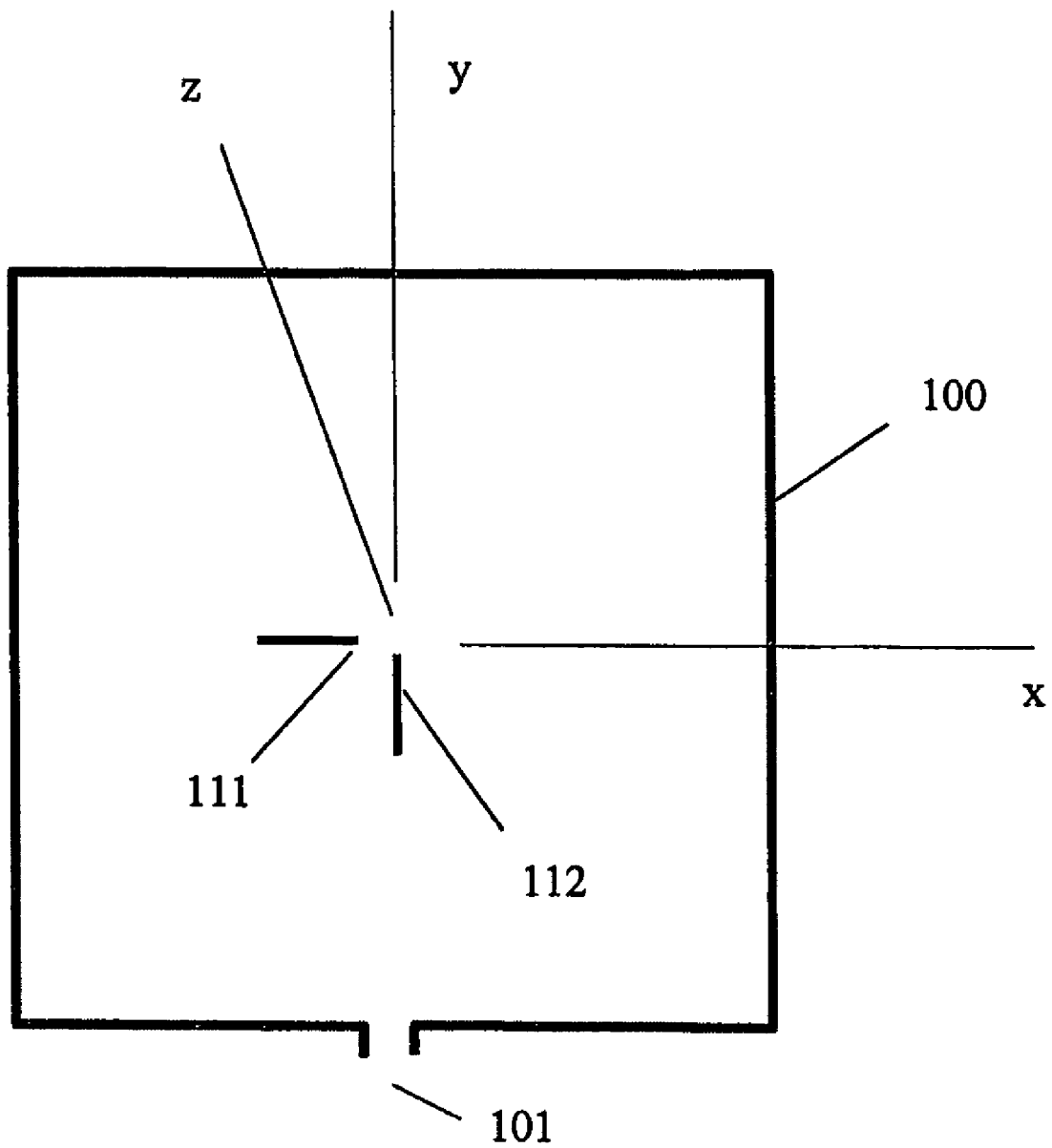
FIG. 2 illustrates an RFID reader antenna and tags oriented such that "dead zones" occur.

FIG. 2 shows an example of some orientations that may result in a "dead zone" in which an RFID tag may not be read by a reader antenna. Reader antenna 100 is shown parallel to the X-Y plane. An RFID tag 111 is shown in the Y-Z plane (orthogonal to the X-Y plane and orthogonal to the reader antenna 100), while RFID tag 112 is shown in the X-Z plane (orthogonal to the X-Y plane and orthogonal to the reader antenna 100). RFID tags, such as 111 and 112, which are oriented as orthogonal to the reader antenna 100, may not allow for good RP coupling between the tag and reader antenna, and thus the tag may not be read by the reader antenna. In addition to the orientations shown for RFID tags 111 and 112, any orthogonal plane in the inter-cardinal planes will also result in a dead zone. For example, if RFID tags 111 or 112 are rotated about the Z-axis, they will still be orthogonal to the X-Y plane and orthogonal to reader antenna 100. Hence, it may be difficult or impossible for the reader antenna 100 to read the RFID tags 111 and 112. These tags may be considered to be in a "dead zone" with respect to the reader antenna. In this embodiment, the term "dead zone" refers to a volume and/or area where an antenna has limited ability to or cannot detect an RFID contained within the volume and/or area.

Figure 3:
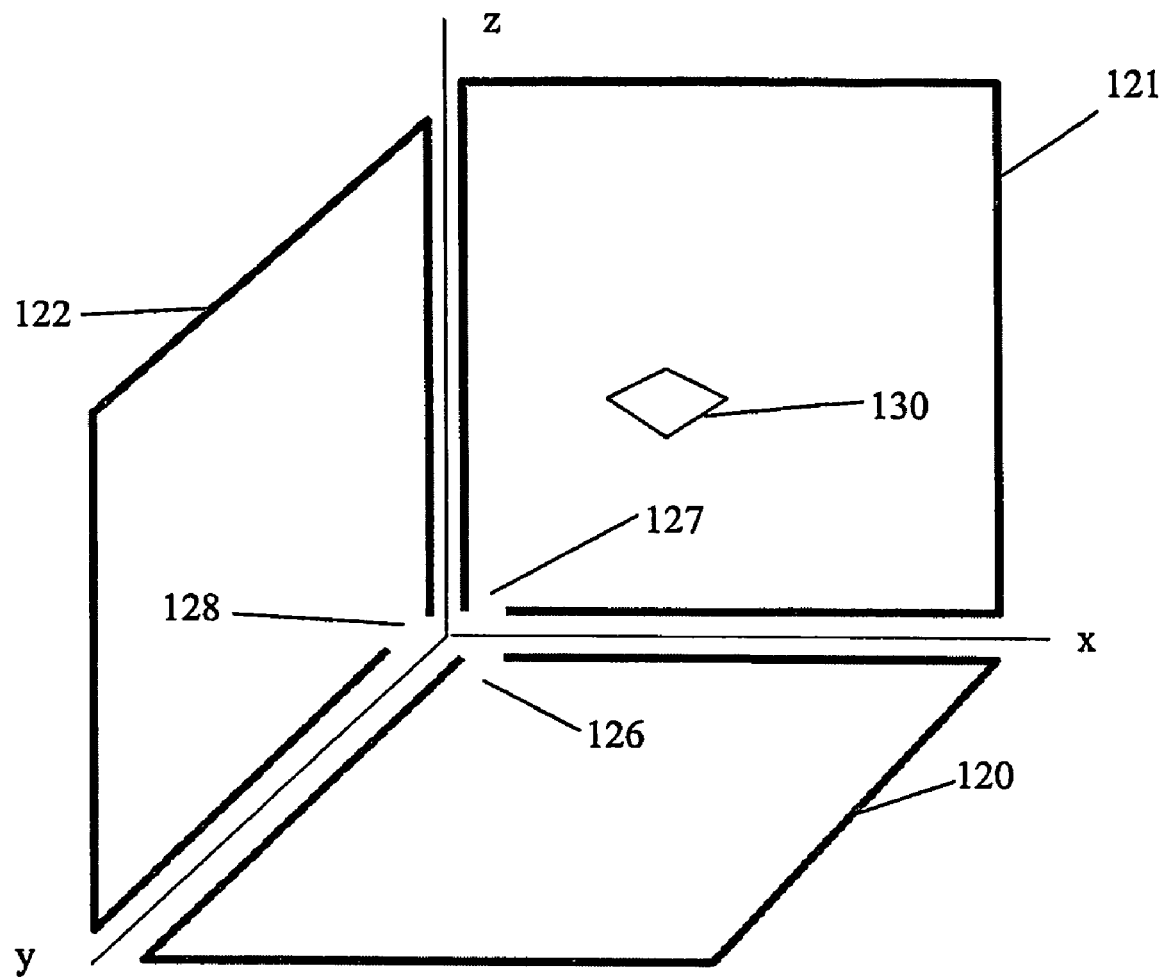
FIG. 3 illustrates three RFID reader antennae and a randomly oriented tag readable by at least one of the RFID reader antennae in accordance with a preferred embodiment of the invention.

In accordance with a preferred embodiment of the invention, in order to reduce or eliminate the dead zones, additional reader antennae may be utilized. FIG. 3 illustrates one manner of permitting at least one non-orthogonal configuration of reader antennae and tags in accordance with a preferred embodiment of the invention. For example, to read RFID tag 130, which may be oriented in a random orientation, RFID antennae may be situated as follows: reader antenna 120 in the X-Y plane, reader antenna 121 in the X-Z plane, and reader antenna 122 in the Y-Z plane. Each reader antenna may have a feed point (126, 127, and 128, respectively) connected to circuitry such as tuning components, switches, wiring, an RFID reader, etc. (not shown), as is well known in the art.

Figure 4:
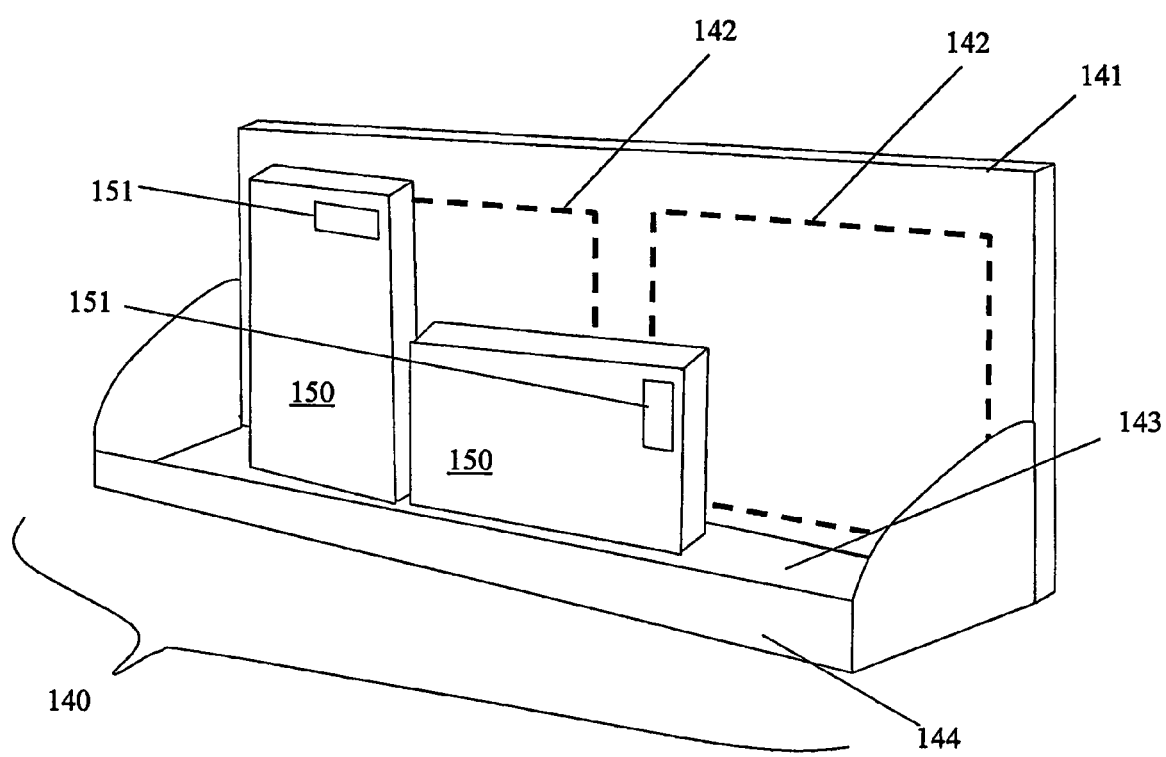
FIG. 4 illustrates an RFID antenna system incorporated in an, example form factor in accordance with a preferred embodiment of the invention.

In accordance with a preferred embodiment of the invention, form factors may be incorporated which force specific orientations of reader and tags in order to reduce the number of reader antennae. One such form factor is the RFID shelf 140 shown in FIG. 4 and described in a previously referenced application, which is adapted to read tags associated with a product, for example, optical disks such as DVDs 150. The product such as DVDs 150 used with this antenna form factor can be placed in the X-Z plane, that is, "face forward" as shown in FIG. 4. Each DVD 150 has an associated RFID tag 151 (although any location may be used, the tag is shown for illustration purposes attached to the face of the DVD). A rear plane 141 contains one or more rear plane reader antennae 142 that are parallel to the orientation of the RFID tags 151. There is also a supporting surface 143 such as horizontal or sloped shelf or other support, and a front retaining lip 144 (alternatively, a bar, wire, other structure (or no structure at all) could also be used). The front retaining lip 144 may serve to contain DVDs 150 within the structure, so they do not slide forward and fall from the shelf 140. In one embodiment, front retaining lip 144 encourages a preferred orientation of RFID tag 151, that is, the front retaining lip 144 acts to encourage a parallel orientation of RFID tag 151 with respect to rear plane antennae 142. The preferred orientation can be realized because the distance on surface 143 between the rear plane 141 and the front retaining lip 144 is large enough to hold one or more DVDs 150 in the preferred face-forward orientation, but not large enough to hold a DVD 150 in an edge-forward (top forward, bottom forward, or spine-or side-forward orientation). Thus, due to the physical constraint formed by surface 143 and/or the front retaining lip 144, the DVD 150 cannot conveniently be positioned in the X-Y ("face up") or the Y-Z ("face sideways") planes. In this embodiment, only one (or a minimal number of) rear plane reader antenna 142 is required.

In accordance with a preferred embodiment, a tag may be placed on a non-planar product (preferably, having a curvature that does not seriously de-tune the tag performance). The non-planar tag (e.g., one that is adhered, affixed, or otherwise coupled to a cylindrical surface) will have a finite projection in two orthogonal planes throughout 360° of rotation. If the projection is large enough to allow for adequate coupling, only two reader antennae will be required.

Figure 5:
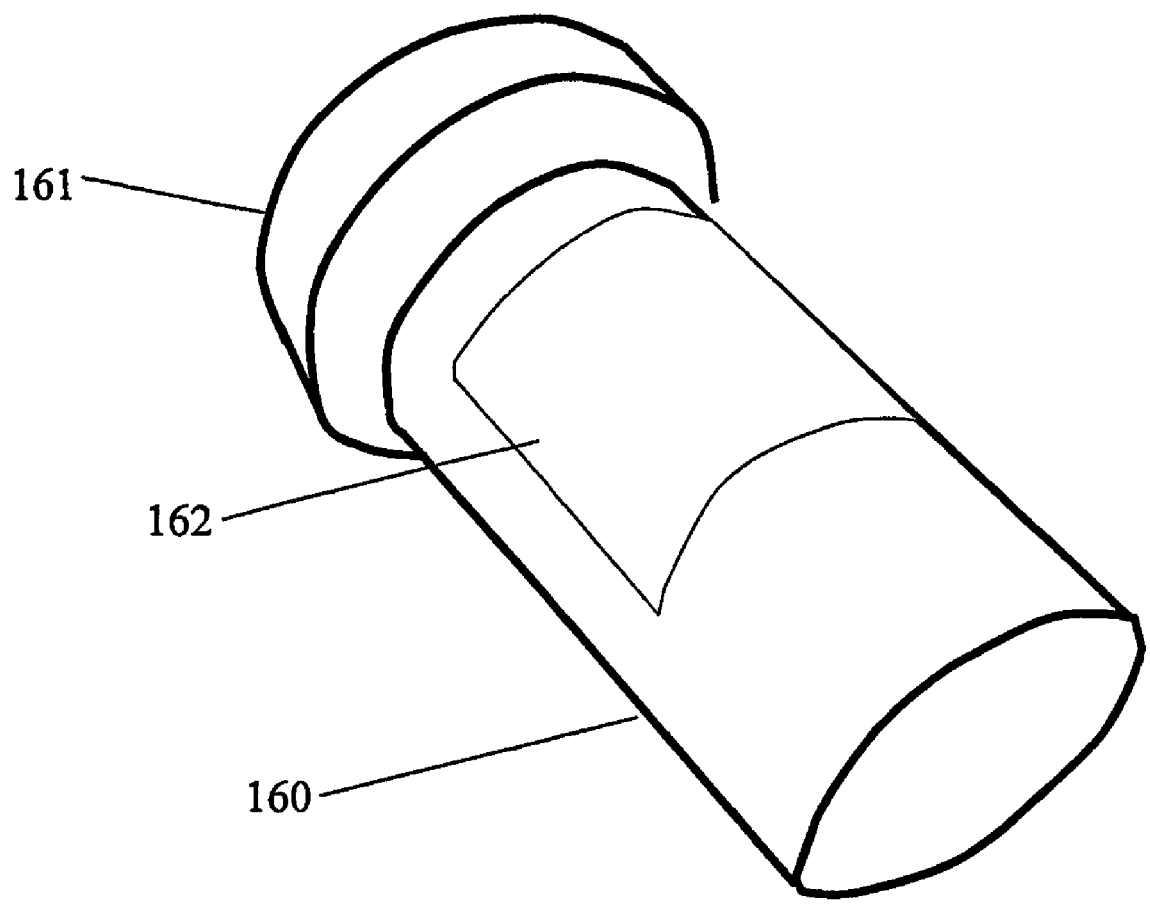
FIG. 5 illustrates an RFID tag adhered to a non-planar surface in accordance with a preferred embodiment of the invention.

FIG. 5 shows an RFID tag 162 that has been applied to the non-planar surface such as the surface of a bottle or vial 160. Affixing an RFID tag to a non-planar surface can avoid creation of dead zones. In accordance with a preferred embodiment, the tag can be adhered, affixed, or otherwise coupled to a doubly curved surface such as that of a sphere. This results in the use of only one reader antenna with no dead zones present. To the extent it may be difficult to adhere a non-flexible tag to a doubly curved surface, a minimum of two reader antennae may be required for random placement of products having form factors that do not force specific orientations. In another embodiment, an RFID tag can be applied to the bottom of the vial 160, or to the cap 161. These locations would lend themselves to planar tag placement rather than the curved tag placement shown for the RFID tag 162.

A relatively flat, planar, or rectilinear product such as the DVD 150 discussed previously lends itself to placement in a preferred orientation (such as a face-forward orientation). That is, such a product may be encouraged into predictable orientations by the geometry of a supporting structure (such as shelf 140) or may be encouraged by a retailer's orderly placement of merchandise (e.g., with one side forward to the customer, or in a "this end up" orientation). There are instances, however, where a product may be orientated randomly and unpredictably, which may make it more difficult to read an attached RFID tag with a simple reader antenna. An example is a pharmacy environment where merchandise such as prescription medicines, drugs, etc. ("prescriptions") may be placed in containers such as vial 160, which in turn may be placed randomly into prescription envelopes or bags. To read an RFID tag 162 on vial 160 thus may require a specially designed reader antenna.

Figure 6A:
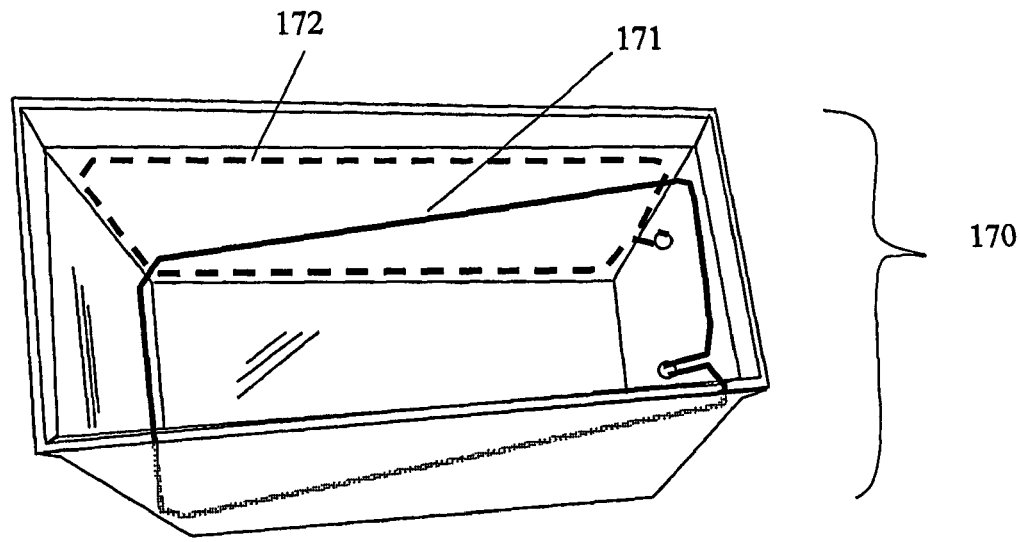
FIGS. 6A and 6B illustrate a diversity RFID antenna system in accordance with a preferred embodiment of the invention.
Figure 6B:
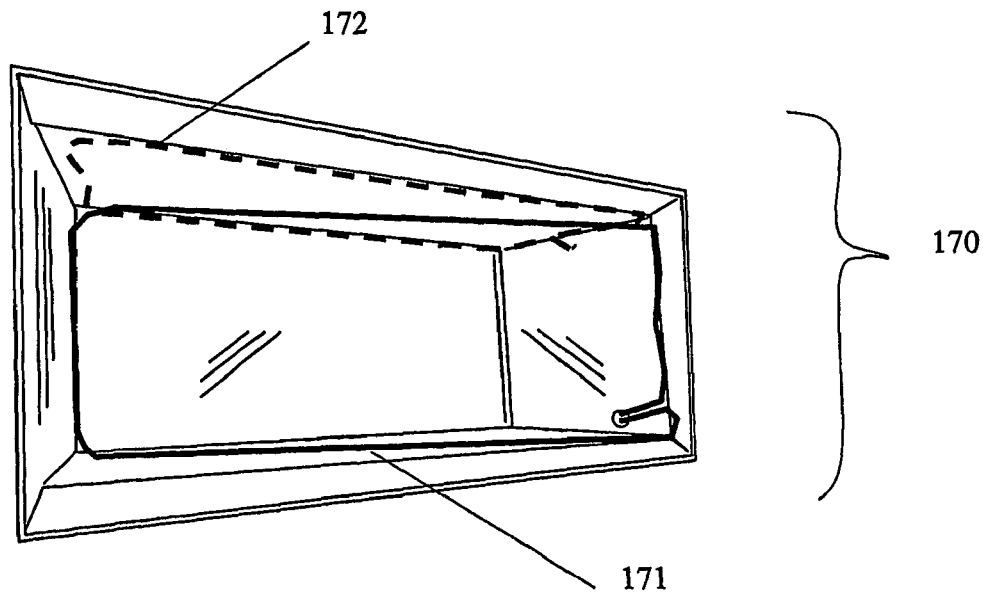

An exemplary RFID antenna system for use in a pharmacy application is shown in FIGS. 6A and 6B. A container or bin 170 may be provided to hold prescription bags, vials, and the like. In accordance with a preferred embodiment of the invention, associated with the bin 170 is an antenna configuration that incorporates both diversity and form factor. This exemplary system is designed with two antennae and may be used with either planar or non-planar tags. If non-planar tags are used, any random orientation of the product may be read. The majority of pharmacy products (pill bottles, liquid containers, etc.) have a cylindrical shape (single curved surface) to which a tag may be easily applied. As seen in FIGS. 6A and 6B, one of the antennae is a loop 171, preferably encircling (or otherwise surrounding a volume of) the bin. As shown in this exemplary implementation, loop 171 is configured with a slight horizontal forward tilt. A second antenna loop 172 is configured in parallel with and, preferably, attached to a side of bin 170. Preferably, for RFID applications, each antenna loop 171 and 172 would be connected to additional circuitry (not shown) that may include tuning components, switching components, wiring, etc., and an RFID reader, as is well known in the art. To optimize the system for use with a planar tag, a form factor is preferably used which does not permit the tag to lean forward.

Figure 7:
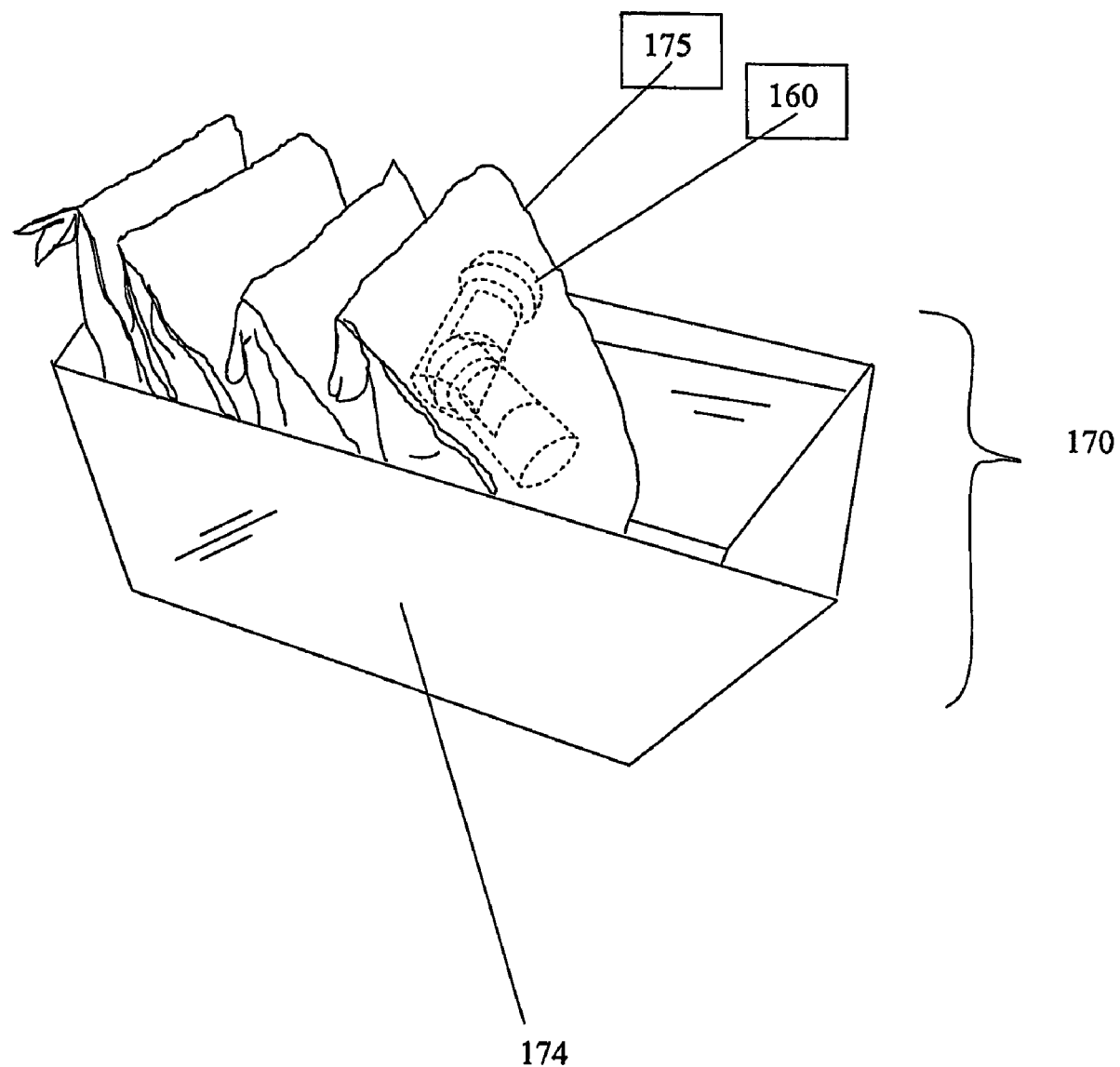
FIG. 7 illustrates a bin of a diversity RFID antenna system in accordance with a preferred embodiment of the invention.

FIG. 7 shows an exemplary implementation of bin 170 as used in a pharmacy or other similar environment. As shown, the RFID tagged products such as vials 160 are placed in bags 175 and are stood upright or most commonly with a slight backward tilt such that only infrequently will there be an unfavorable orientation between the reader antennae 171, 172, and the products 160 (shown in phantom by dashed lines) and their RFID tags 162 (not shown).

In certain applications (e.g., pharmacies), multiple bins 170 may be used to hold products. It may furthermore be desirable to isolate the reading of RFID tags within each bin 170, in order to locate the products associated with the tags. For example, bin 170 may have an associated RF shield such as a metal enclosure 174 to reduce the ability of RFID antenna reader to locate products outside of bin 170.

EXAMPLES

The following are examples of specific implementations of preferred embodiments of the invention. As can be appreciated by those of ordinary skill in the art, any number of other implementations of the embodiments of the invention may be achieved when reducing embodiments of the invention to practice.

Figure 8:
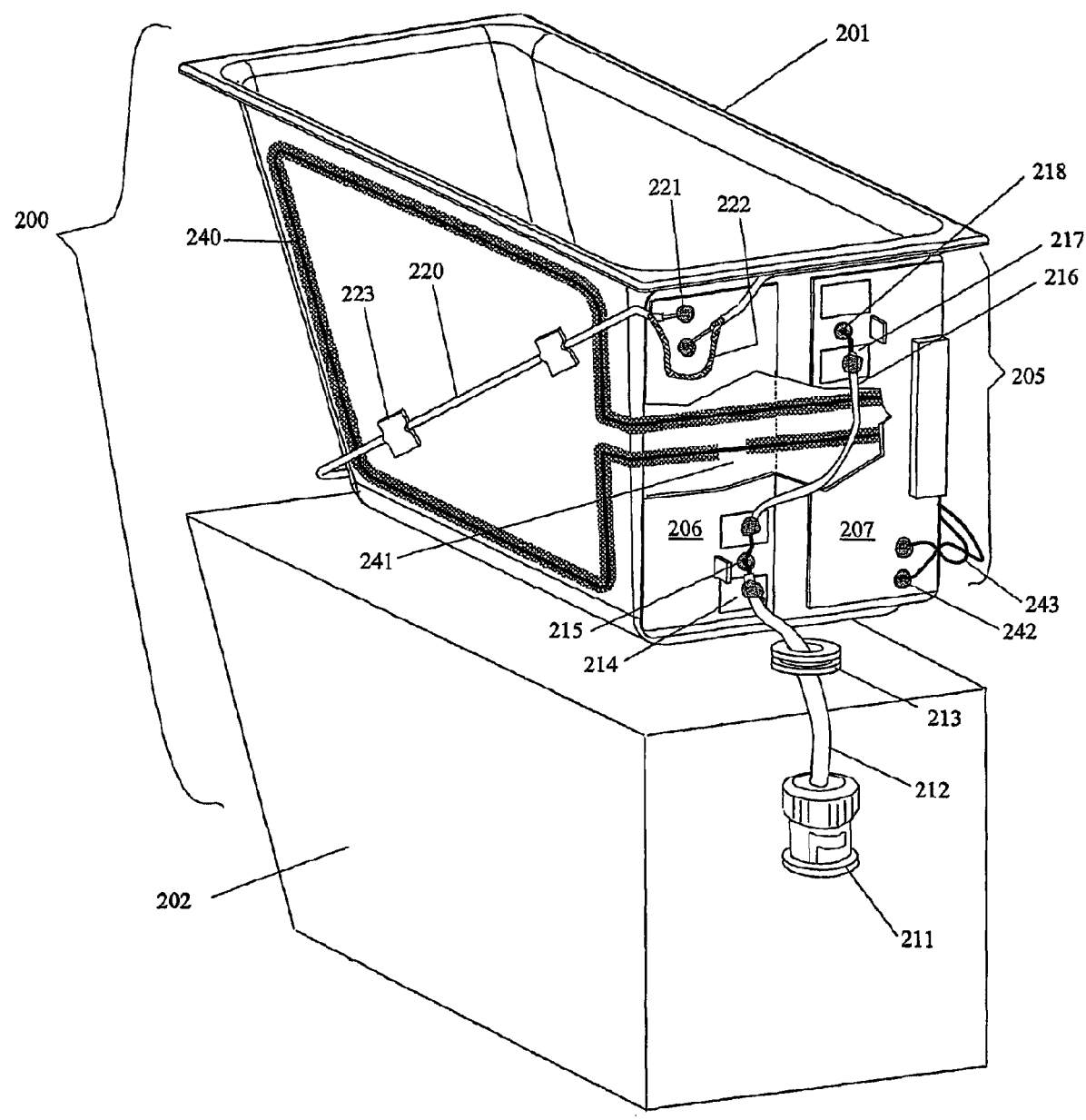
FIG. 8 illustrates a detailed view of a bin of a diversity RFID antenna system in accordance with a preferred embodiment of the invention.

FIG. 8 shows an exemplary implementation of a bin 200 used to hold tagged items such as prescriptions. The bin preferably includes an inner shell 201 that is transparent to RF energy using any such known material (e.g., molded plastic, fiberglass, etc.). Prescriptions can be placed within this inner shell 201, preferably within envelopes as is the usual case in a pharmacy environment. The inner shell 201 may be partially enclosed within an outer shell 202 that blocks RF energy, for example, to confine the read range of reader antennae within the bin 200.

Preferably, circuitry 205 is associated with the bin 200. Circuitry 205, for example, may include tuning components, switching components, wiring, connections, etc., as needed for the reader antennae associated with bin 200. For example, such circuitry may include tuning boards 206 and 207. A connector such as a BNC connector 211 may be used to provide an RF connection between circuitry 205 and external circuitry such as an RFID reader (not shown). Additional connections (not shown) may be made to external circuitry, for example, control or power connections, as have been described in previously referenced applications which have been incorporated herein by reference. The RF connection from connector 211 may be made through a coaxial cable 212. A device such as rubber grommet 213 may be used to protect coaxial cable 212 where it passes through an opening or hole (not shown) in outer shell 202. RF connections may be made, for example, by connecting or soldering the coaxial cable jacket to a ground pad 214, and the coaxial cable center conductor to a tie point 215, both on tuning board 206. Likewise the RF connection may be carried via coaxial cable 216 to a ground pad 217 and a tie point 218 on tuning board 207.

Diagonal reader antenna 220 may be tied to tuning board 206 through connection points 221. One implementation of the diagonal reader antenna 220, as shown in FIG. 8, is a coaxial cable with its center conductor attached at connection points 221. The outer shield conductor need not be connected to any other circuitry. If the balun 225 (discussed below) is used, the ends of the outer shield conductor may optionally be joined as shown at 222. The diagonal reader antenna 220 may be attached to the inner shell 201 using adhesive devices 223, or any other connection means. The exemplary diagonal reader antenna 220 thus essentially surrounds the bin 200, with a sloping orientation.

Another reader antenna, a wrap-around reader antenna 240 is provided in this exemplary implementation. In this example, a loop is wrapped around both sides of inner shell 201. The implementation shown in FIG. 8 uses a microstrip construction, which consists of a wider conductive strip and a narrower conductive strip, separated by an insulating material. An example embodiment uses foil conductors on a flexible plastic sheet. At point 241, preferably near the mid-point of the wraparound reader antenna 240, is an exemplary gap in the wider conductor, forming a balanced feed (balun) antenna as described in the previously referenced '721 application. In this example, the wraparound reader antenna 240 continues around the inner shell 201 to the opposite side (shown on FIG.

9). Preferably, connections to the tuning board 207 are made at point 242, using wiring or other connectors 243.

Figure 9:
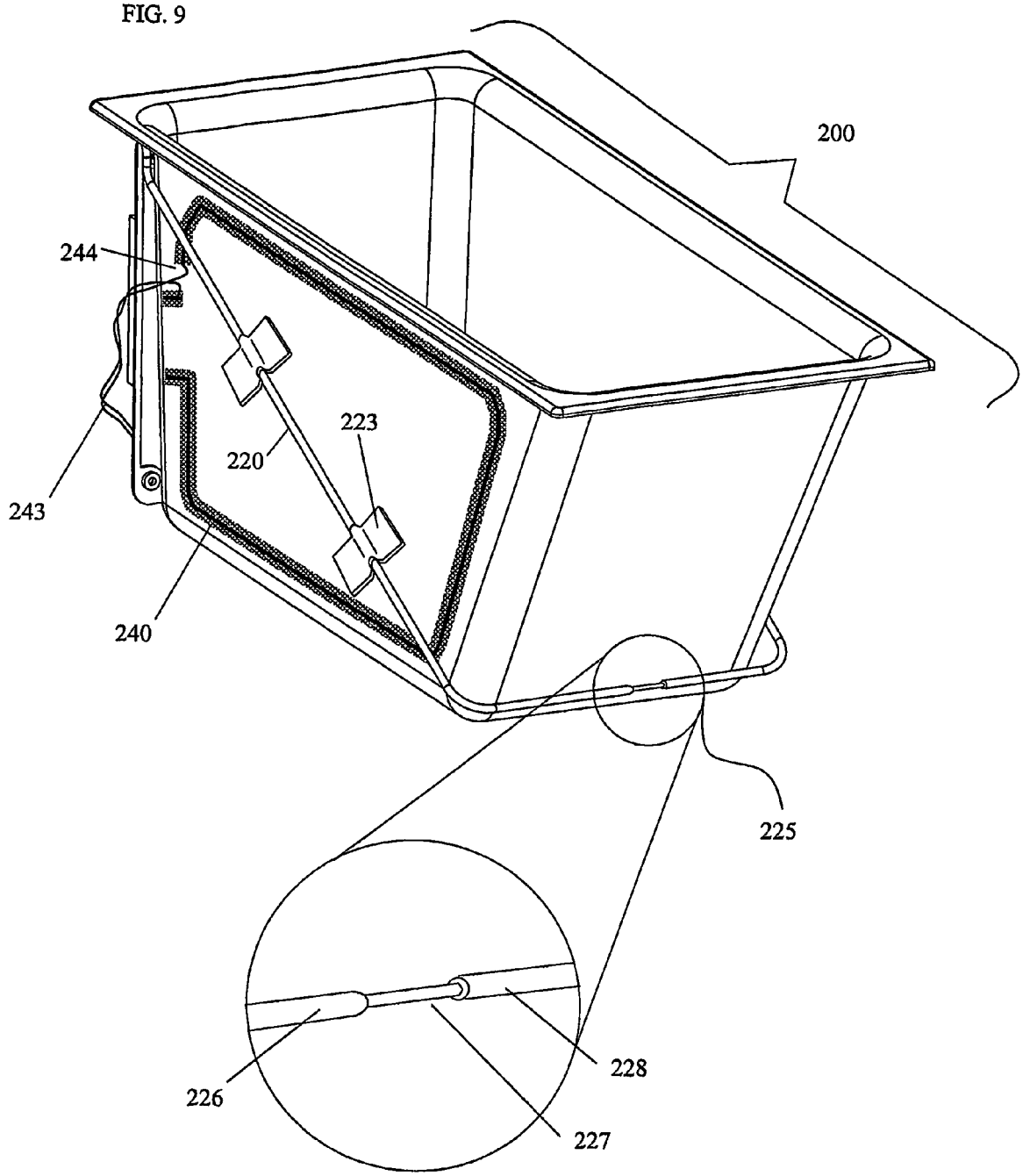
FIG. 9 illustrates a second detailed view of a bin of a diversity RFID antenna system in accordance with a preferred embodiment of the invention.

FIG. 9 shows the view from the opposite side of bin 200 shown in FIG. 8. In this embodiment, the connectors 243 attach to points 244, on the ends of the narrower conductor of wraparound reader antenna 240. The wider conductor of wraparound reader antenna 240 need not be connected to any external circuitry.

Also shown at approximately the midpoint (relative to the ends) of diagonal reader antenna 220 is a balun 225 provided on diagonal reader antenna 220. This balun is formed (as described in the previously referenced '721 application) by removing a portion of the shielding (outer) coaxial cable. Thus, approaching the balun point, the diagonal reader antenna 220 is in the form of the usual coaxial cable construction 226, with the shield intact. At the balun point, a short gap 227 is made in the shield, leaving the center conductor intact. The insulation around the center conductor is preferably left intact, but may also be removed. After a short gap 227, the diagonal reader antenna 220 continues at point 228 as, for example, a coaxial cable with the outer shield intact.

Any number of variations, changes, or modifications may be made to these implementations. For example, the balun may be omitted on either or both reader antennae. Either or both antennae may be constructed using coaxial cable, microstrip, or other conductive material such as wires, conductive paint, etc. The antennae may be on the outside of inner shell 201, on the inside, or molded or otherwise contained partly or fully within the inner shell 201. The diagonal reader antenna may be composed of additional loops in series or in parallel. The wraparound antenna may be composed of a single path as shown in FIGS. 8 and 9, or may be composed of a loop on each side, with the two loops being in series or parallel.

Figure 10:
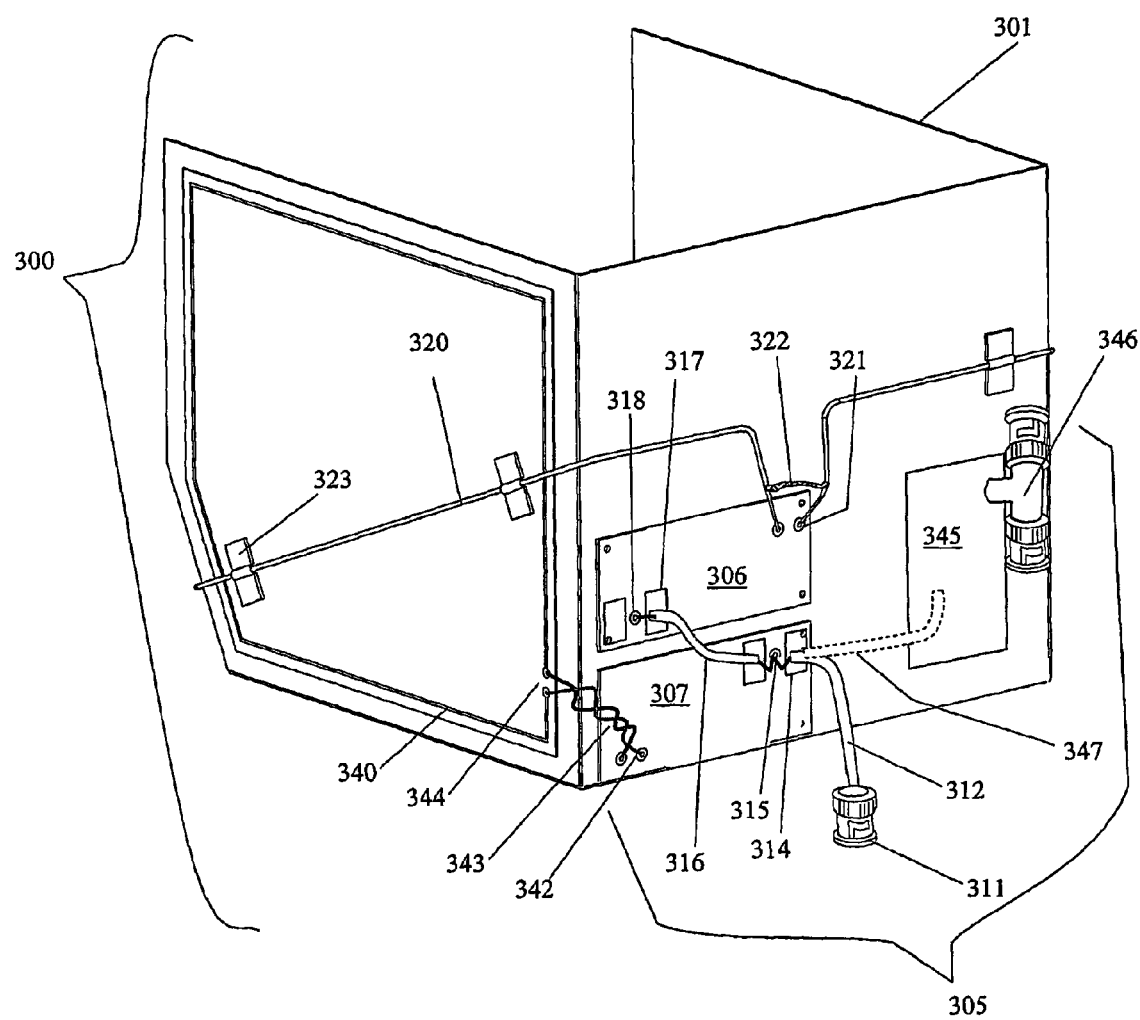
FIG. 10 illustrates a detailed view of a large bin of a diversity RFID antenna system in accordance with a preferred embodiment of the invention.

It may be desired to have a bin larger than the bin illustrated in FIGS. 7 through 9. FIG. 10 shows one example of an "oversize bin" 300, which may be used to hold items larger than typical prescription envelopes. The oversize bin 300 preferably includes an inner shell 301 that is transparent to RF energy (e.g., molded plastic, fiberglass, etc.). Items are placed within this inner shell 301. The inner shell 301 may be partially enclosed within an outer shell (not shown) that blocks RF energy, for example, to confine the read range of reader antennae within the bin 300.

Associated with the bin 300 is circuitry 305 that may include tuning components, switching components, wiring, connections, etc., as needed for the reader antennae associated with bin 300. For example, such circuitry may include tuning boards 306 and 307. A connector such as a BNC connector 311 may be used to provide an RF connection between circuitry 305 and external circuitry such as an RFID reader (not shown). Additional connections (not shown) may be made to external circuitry, for example, control or power connections, as have been described in previously referenced applications. The RF connection from connector 311 may be made through a coaxial cable 312. RF connections may be made, for example, by connecting or soldering the coaxial cable jacket to a ground pad 314, and the coaxial cable center conductor to a tie point 315, both on tuning board 307. Likewise the RF connection may be carried via coaxial cable 316 to a ground pad 317 and a tie point 318 on tuning board 306.

Diagonal reader antenna 320 may be tied to tuning board 306 through connection points 321. Antenna 320, as shown in FIG. 10, is a coaxial cable with its center conductor attached at connection points 321. The outer shield conductor need not be connected to any other circuitry. If the balun 325 (discussed below) is used, the ends of the outer shield conductor may optionally be joined as shown at 322. The diagonal reader antenna 320 may be attached to the inner shell 301 using adhesive devices 323 or any other connection means. In this embodiment, the diagonal reader antenna 320 essentially surrounds the bin 300 with a sloping orientation.

A side reader antenna 340 can also be provided. This is shown as a loop antenna on one side of inner shell 301, although a wraparound antenna may also be used as discussed previously. The embodiment shown in FIG. 10 uses a loop construction, which consists of a conductive strip. An example embodiment uses foil conductors on a plastic sheet. The side reader antenna 340 is connected from feed points 344 by wiring or other connectors 343 to points 342 on tuning board 307. Instead of the side reader antenna 340 being a loop antenna, it may also be a microstrip construction as previously described, and may incorporate a balun, also previously described.

A secondary controller 345 may be included in the bin as shown. The secondary controller 345 may receive RF energy through connector 346, and may route the RF energy through connection 347 to the tuning boards 306 and 307, instead of using connector 311. RF energy may also be routed from secondary controller 345 to antennae on other bins or other devices (not shown).

Figure 11:
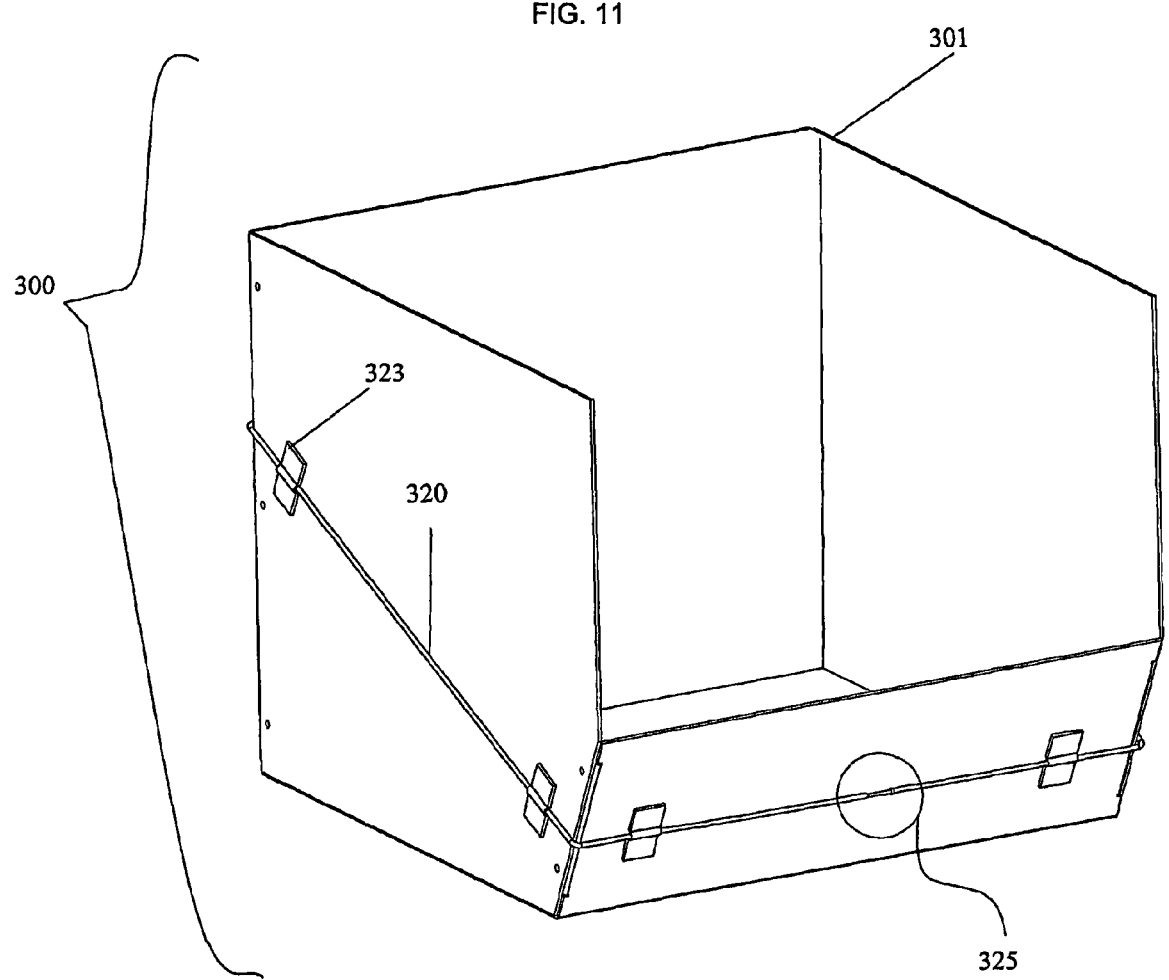
FIG. 11 illustrates a second detailed view of a large bin of a diversity RFID antenna system in accordance with a preferred embodiment of the invention.

FIG. 11 shows the view from the opposite side of bin 300. Diagonal reader antenna 320 may be provided with a balun 325 as described earlier.

Any number of variations, changes, or modifications may be made to these implementations. For example, the balun may be omitted on either or both reader antenna. Either or both antennae may be constructed using coaxial cable, microstrip, or other conductive material such as wires, conductive paint, etc. The antennae may be on the outside of inner shells 201 or 301, on the inside, or molded or otherwise contained partly or fully within the inner shells 201 or 301.

Figure 12:
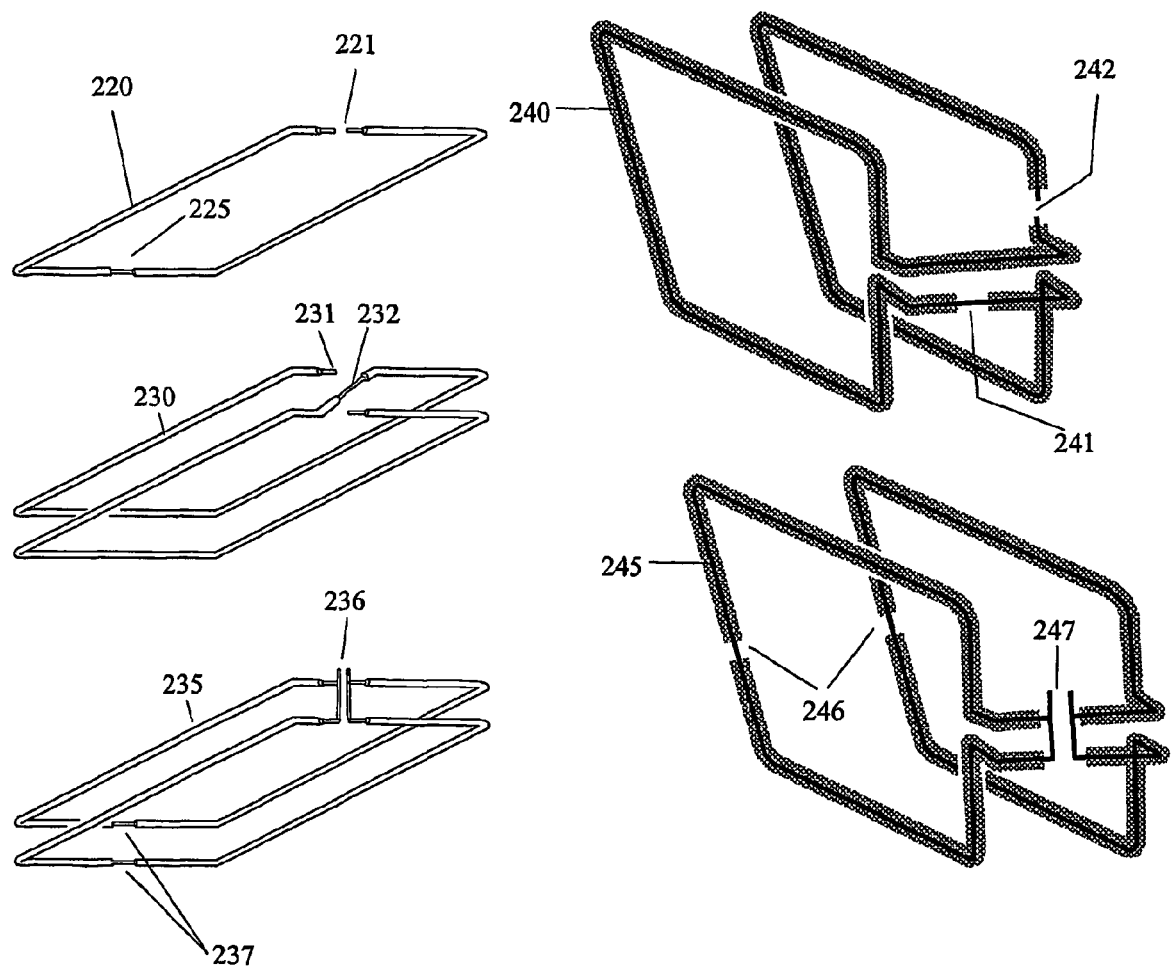
FIG. 12 illustrates various exemplary implementations of antenna form factors for use in a diversity RFID antenna system in accordance with a preferred embodiment of the invention.

FIG. 12 shows a sample of some of the many possible implementations of antennae for use in the system in accordance with embodiments of the invention. For example, diagonal loop antenna 220 consisting of a single loop, previously discussed, is shown having feed points 221 and an optional balun 225. A dual-loop-in-series antenna 230 is shown having feed points 231 and an optional balun 232. A dual-loop-in-parallel antenna 235 is shown having feed points 236 and optional balun 237.

FIG. 12 also shows the wraparound antenna 240, previously discussed, in the form of a single loop having feed points 242 and an optional balun 241. A dual-loop-in-parallel wraparound antenna 245 is shown having feed points 247 and an optional balun 246.

Figure 13A:
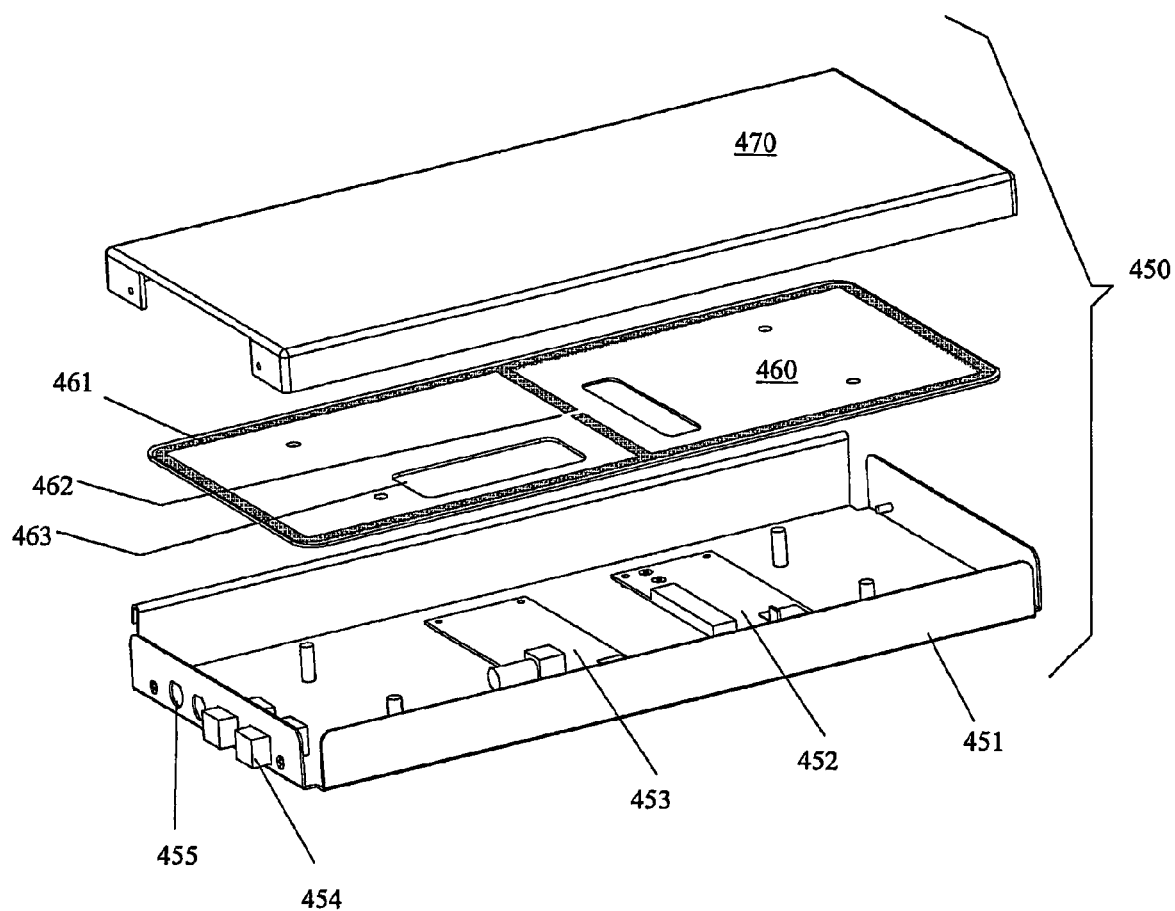
FIG. 13A illustrates a view of a shelf of an RFID antenna system in accordance with a preferred embodiment of the invention.

Besides the diversity reader antennae described here as particularly useful for detecting randomly oriented RFID tags within a container, it may also be desired to provide reader antennae for use within a shelf. Previously referenced application No. 60/479,846, disclosed a "figure-eight" antenna used in a vertical orientation. FIG. 13A shows a horizontal orientation. A fixture such as a shelf 450 is provided to hold items. The shelf may incorporate a supporting or weight bearing structure 451. This structure 451 may be metal or other RF—blocking material. The shelf 450 may include at least one antenna tuning board 452, and optionally one or more secondary controllers 453. Connectors 454 may be provided for RF connections, and connectors 455 for non-RF connections such as serial communications, etc. The wiring within the shelf is not shown but has been described earlier in this or the previously referenced applications.

Antenna support plane 460 can be included within shelf 450. This support plane may be an insulating material such as plastic or fiberglass. The support plane 460 supports a reader antenna 461 that may be provided in loop form, preferably in the "figure-eight" form as shown made of metal foil. However, other fabrication methods may be used such as wire, coaxial cable, or other conductors. A feed point 462 is provided for the antenna to be connected to circuitry such as tuning board 452. Openings 463 may be provided in support plane 460, for example, to allow access to circuitry or reduce weight or cost Shelf cover 470 is provided to cover the antenna 461. The shelf cover is preferably transparent to RF energy.

Figure 13B:
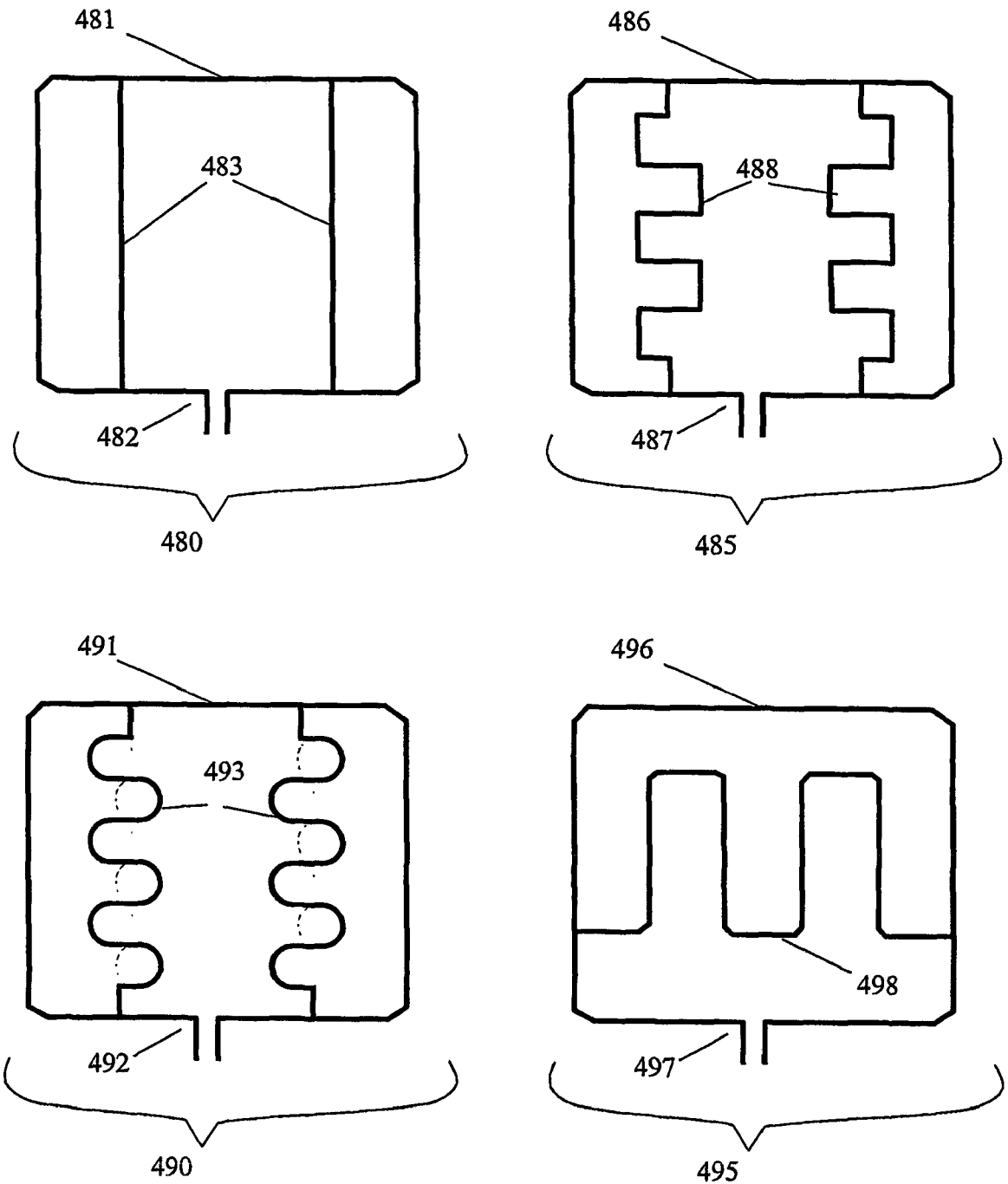
FIG. 13B illustrates various exemplary implementations of antenna form factors for use in a shelf RFID antenna system in accordance with a preferred embodiment of the invention.

Besides the figure-eight form factor of antenna 461, any number of antenna form factors may be used in accordance with preferred embodiments of the invention, as, for example, within a shelf. Some exemplary form factors are shown in FIG. 13B. For some applications, these may perform better than simple loop antennae. Antenna 480 includes a loop conductor 481 with a feed point 482. Also incorporated in antenna 480 are one or more additional conductive pathways 483 connecting into the loop conductor, and forming conductive paths in parallel to some portions of the loop conductor. In antenna 480, the additional conductive pathways 483 are essentially straight. The loop conductor 481 and additional conductive pathways 483 may be made of conductive materials, for example, wire, metal foil, printed circuitry, or the outer jacket of a coaxial cable.

Antenna 485 includes a loop conductor 486 with a feed point 487. Also incorporated in antenna 485 are one or more additional conductive pathways 488 connecting into the loop conductor and forming conductive paths in parallel to some portions of the loop conductor. In antenna 485, the additional conductive pathways 488 are generally serpentine in shape, made of a series of straight segments.

Antenna 490 can include a loop conductor 491 with a feed point 492. Also incorporated in antenna 490 are one or more additional conductive pathways 493 connecting into the loop conductor, and forming conductive paths in parallel to some portions of the loop conductor. In antenna 490, the additional conductive pathways 493 are generally serpentine in shape, made of a series of curved segments.

Antenna 495 includes a loop conductor 496 with a feed point 497. Also incorporated in antenna 495 are one or more additional conductive pathways 498 connecting into the loop conductor, and forming conductive paths in parallel to some portions of the loop conductor.

Figure 14:
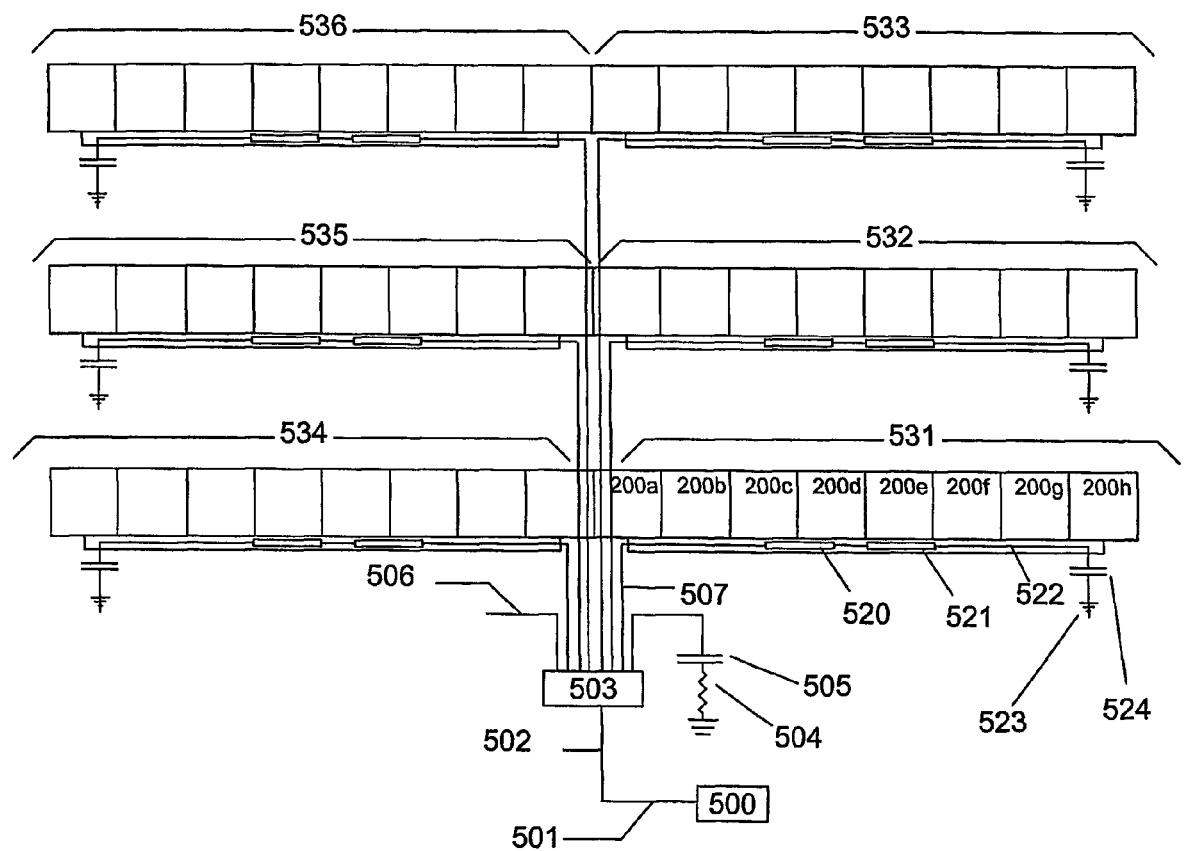
FIG. 14 illustrates an electrical circuit for connecting an RFID reader to a plurality of diversity RFID antennae in accordance with a preferred embodiment of the invention.

FIG. 14 illustrates an exemplary wiring connection method in accordance with an embodiment of the invention. An RFID reader 500 connects to a ¼ wavelength of 75 ohm coaxial cable 501 (in this example, being approximately 12 feet long), which in turn connects to a ¼ wavelength of 50 ohm coaxial cable 502 (12' 1" long). Coaxial cable 502 is connected to branching connector 503 that branches the coaxial line into multiple additional 50 ohm coaxial cables, including the following:

A short 50 ohm cable to a 50 ohm resistor 504 for circuit protection purposes. A DC-blocking capacitor 505 can be used if any DC is superimposed on the RF signal.

A length of 50 ohm cable 506 for tuning optimization purposes, approximately 3' 4" long.

Multiple 50 ohm cables 507, each leading to a group of bins (for example, group or rack 531 composed of bins 200a-200h). Cable 507 is approximately 4' 9" long.

In this example, cable 507 leads to a pair of secondary controllers 520 and 521. Each secondary controller may, for example, feed RF to and control switching of eight reader antennae, for example, secondary controller 520 may control a diagonal antenna and a wraparound antenna on each of bins 200a-200d, while secondary controller 521 may control antennae on each of bins 200e-200h. The use of a secondary controller to control antennae has been described in the previously referenced applications.

The RF connection can continue past secondary controller 521 to a 6' long coaxial cable 522 and then is shorted to ground at point 523, that is, the center conductor of the coaxial cable is connected here to the outer sheath. If any DC is superimposed on the RF signal, a DC blocking capacitor 524 may be used, for example, a 0.01 microfarad capacitor. A DC blocking capacitor is used in order to prevent a DC short which may affect the performance of the reader. A 0.01 uF capacitor is frequency dependent. At 13.56 MHz, the capacitor performs very dose to a short circuit and at DC it appears to be an open circuit which masks the physical short circuit from the reader for DC conditions.

Although the example shown in FIG. 14 connects the reader to six racks 531-536, each having eight bins, it should be understood that more or fewer racks may be connected, and each rack may have more or fewer than eight bins.

Figure 15:
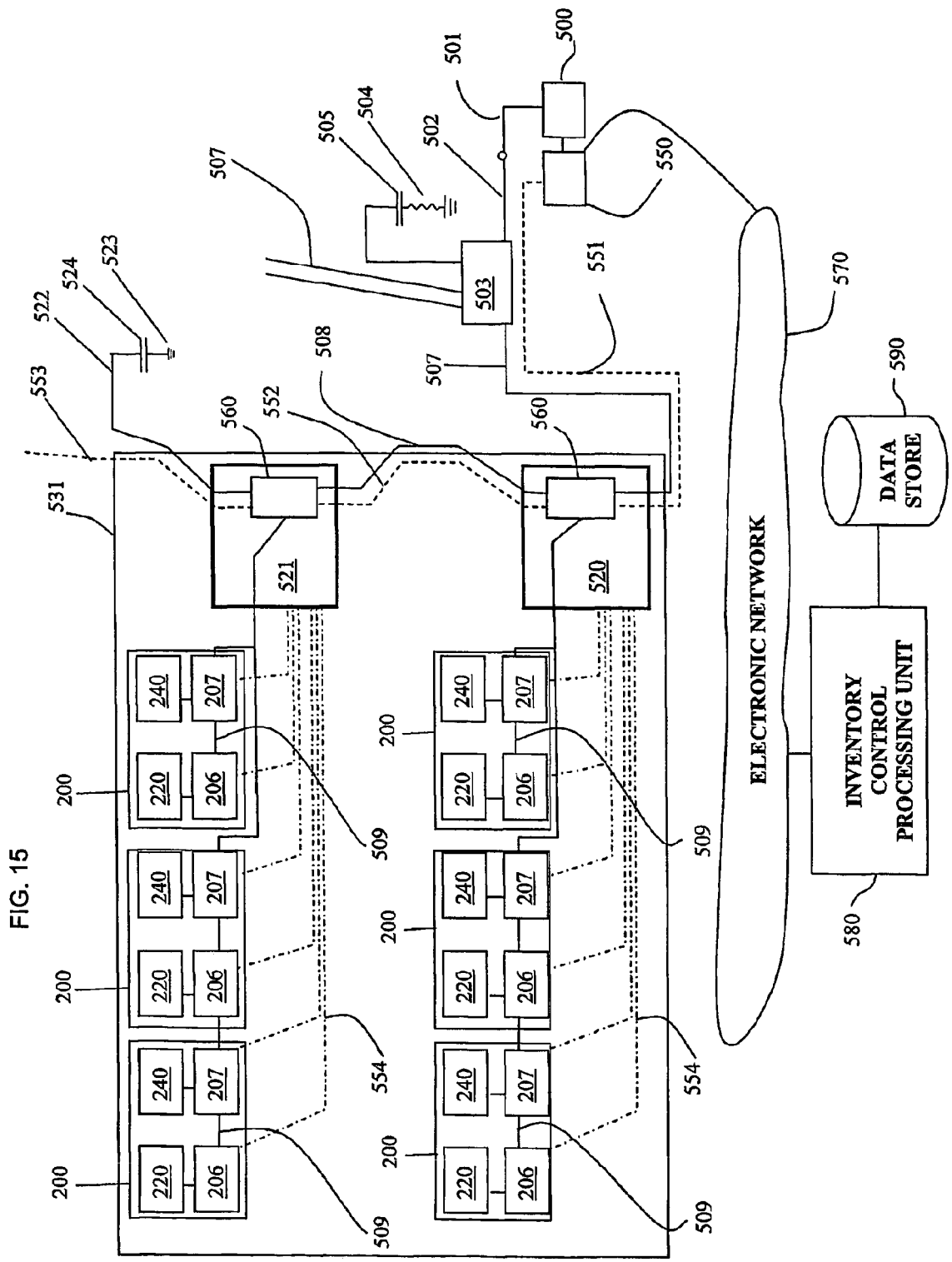
FIG. 15 is a block diagram illustrating an exemplary antenna system incorporating primary and secondary controllers to select antenna in accordance with an exemplary embodiment of the invention.

FIG. 15 illustrates another exemplary implementation of an embodiment of the invention in the form of an RFID antenna system. The exemplary antenna system includes diagonal reader antennae 220 and wraparound reader antennae 240, each paired within a bin 200, and having associated antenna tuning boards 206 and 207. A rack 531 of several bins 200 is controlled by secondary controllers 520-521. Also included are the impedance matching circuitry (elements 501-505), a primary controller 550, and an RFID reader 500. (Although not shown, it should be apparent that antenna tuning boards 206 and 207 may include a selector switch, tuning components, a switch to tune or detune the associated antenna on demand, and other necessary components, and that secondary controllers 30 may include logic and switching controls as necessary to perform the operations described herein.)

Each secondary controller 520, 521 of the exemplary system is connected to one or more of the antenna tuning boards 206, 207 by a connection such as a coaxial cable 509 for transmission of RF signals and control cables 554 for digital signals. In FIG. 15, for each secondary controller there are shown three bins 200, each bin having a tuning board 206 with a diagonal antenna 220 and a tuning board 207 with a wraparound antenna 240 (although there may be more or less bins, tuning boards, and antennae per secondary controller in reducing the exemplary system to practice). Preferably, the tuning boards are at similar short distances from their respective secondary controllers.

The RFID feed system shown in FIG. 15 incorporates an RFID reader 500 and an impedance matching circuit incorporating elements 501-505 as discussed previously.

Parts or all of the systems described so far may be contained within a structure or structures such as pharmacy storage bins, shelves, counters, etc., and certain elements may be contained within a rack 531 of bins.

In another exemplary implementation, a matching circuit may be formed from common coaxial cable. In this configuration, a 50 Ω terminator 504 (whose impedance is equal to the characteristic impedance of the system) is placed in parallel (using connection 503) with the RF cables 507 leading to each rack of bins such as 531, etc. For each rack 531 of bins, after the last secondary controller 521 on the RF cable (507, 508), there is placed a length of coaxial cable 522 leading through a DC blocking capacitor 524 to a ground 523 (the center of the RF cable at this point being shorted to the ground sheath of the RF cable).

In accordance with an embodiment of the invention, a plurality of antennae 220, 240 having associated tuning circuits 206, 207, secondary controllers 520, 521, and associated wiring may all be contained in or on a physical structure, as shown, for example, in FIG. 15 as rack 531 of bins. (For convenience, the term "rack" used herein will be taken to mean one unit or group of bins preferably in physical proximity to one another, and served by one or a few secondary controllers 520, 521. The term "rack" however is not meant to be limiting as to the physical attributes of any structure that may be used to implement embodiments of the invention, but used merely for convenience in explaining the embodiment.) As shown in FIG. 15, rack 531 is provided with multiple antennae that are each connected to a reader 500 by one or more transmission cables including cables 501, 502, 507, 508, 509. The cable 509 interconnects between the tuning circuits 206, 207 and the secondary controllers 520, 521. Cables 508 interconnect secondary controllers within a rack, and cable 507 connects the rack to the common point 503 and thence back through impedance matching coaxial cables 501, 502 to reader 500.

The example in FIG. 15 illustrates the reader 500 being controlled by a primary controller or controller 550 that sends commands or control signals along control cables 551, 552, 553 to select which antenna is active at any time. These control cables may be in series as shown in FIG. 15 or may be in parallel or series-parallel connections. Between racks, the commands or control signals may be carried on control cable 553. Within a shelf, the commands or control signals may be carried by cables 552, 554. The primary controller 550 may be a microprocessor or any processing device (e.g., discrete logic circuit, application specific integrated circuit (ASIC), programmable logic circuit, digital signal processor (DSP), etc.). Furthermore, the racks may also be configured with secondary controllers 520, 521 that co-operate with the primary controller 550 to select antennae. The secondary controllers 520, 521 may also be microprocessors (or other processing devices) with sufficient outputs to control all the antennae within the associated rack.

The controller 550 may selectively operate any or all the switches by sending commands through a digital data communication cable 551 by sending a unique address associated with each tuning circuit 206, 207. The addresses could be transmitted through the use of addressable switches such as, for example, ones identical or similar to a Dallas Semiconductor DS2405 "1-Wire®" addressable switch. Each such addressable switch provides a single output that may be used for switching a single antenna. Preferably, the controller 550 may selectively operate any or all the switches by utilizing one or more secondary controllers 520, 521. For example, the secondary controller 520, 521 may be a microprocessor such as a Microchip Technology Incorporated PICmicro® Microcontroller which can provide multiple outputs for switching more than one antenna, such as all the antennas in proximity to the secondary controller. The controller 550 may also be a microprocessor such as a MicroChip Technology Incorporated PICmicro® Microcontroller, or a microprocessor such as an Intel Incorporated Microprocessor. Communications between the controller 550 and the secondary controller 520, 521 can be implemented by using digital communication signals in accordance with well known communication protocols (e.g., RS-232, RS-485 serial protocols, Ethernet protocols, Token Ring networking protocols, etc.).

In the previously referenced patent applications, the term "intelligent station" is used as a general term to describe equipment, such as a rack 531, which may include a secondary controller, switches and/or tuning circuitry, and/or antennae. More than one intelligent station may be connected together and connected and incorporated with an RFID reader. A primary controller can be used to run the RFID reader and the intelligent stations. The primary controller itself may be controlled by application software residing on a computer.

In a preferred embodiment, the intelligent station system is controlled through an electronic network 570, as shown in FIG. 15. A controlling system that controls the intelligent station system will send command data to the primary controller 550 via Ethernet, RS-232 or similar protocol. These commands include but are not limited to instructions for operating the RFID reader unit 500 and antenna switches associated with tuning circuit 206, 207 The controller 550 is programmed to interpret the commands that are transmitted through the unit. If a command is intended for the reader unit 500, the controller 550 passes that command to the reader unit 500. Other commands could be used for selecting antennae 220, 240, and these commands will be processed if necessary by controller 550 to determine what data should be passed through digital data communication cable 551 to the secondary controllers 520, 521.

Likewise, the secondary controllers 520, 521 can pass data back to the primary controller 550, as can the reader unit 500. The controller 550 then relays result data back to the controlling system through the electronic network 570. The inventory control processing unit 580, shown in FIG. 15, is one example of such a controlling system. As discussed further herein with respect to the intelligent station system, the electronic network and controlling system are used interchangeably to depict that the intelligent station system may be controlled by the controlling system connected to the intelligent station system through an electronic network 570.

Controller 550 of FIG. 15 typically decides whether a command from the electronic network 570 should be sent to reader 500, or should be sent through the digital communication cable 551. Also, controller 550 must relay data it receives from the digital communication cable 551, and from reader unit 500, back to the electronic network. Under one configuration, the electronic network would issue a command to read a single antenna. The controller 550 would then (a) set the proper switch for that antenna, (b) activate the reader, (c) receive data back from the reader, (d) deactivate the reader, and (e) send the data back to the electronic network. Further details of the processing of command signals from a host by the controller can be found in U.S. provisional patent application 60/346,388 (filed Jan. 9, 2002), which has been incorporated by reference in its entirety herein.

An additional advantage of placing the controller 550 between the electronic network 570 and the reader unit as shown in FIG. 15 is that different types of readers 500 can be used as needed. The commands from the electronic network to the controller may be transmitted using generic control data (not reader-specific), thus allowing for expanded uses by various types of readers. For example, the electronic network can send to the controller a "read antennas" command. The controller in turn can then translate this command into the appropriate command syntax required by each reader unit. Likewise, the controller can also receive the response syntax from the reader unit (which may differ based on the type of the reader unit), and parse it into a generic response back to the electronic network. The command and response syntax may differ for each type of reader unit 500, but the controller 550 makes this transparent to the electronic network.

FIG. 15 further shows digital communication cable 551 connecting primary controller 550 to the secondary controllers 520, 521, and RF transmission cable 507 connects the reader 500 to the antennae 220, 240. In this embodiment, the primary controller 550 or secondary controller 520, 521 may operate a tee switch 560 that selects which of the racks (for example, rack 531) or which group of bins 200 will be selected. The tee switch 560 may be separate from or part of a shelf as would be recognized by one skilled in the art. In FIG. 15, the tee switch 560 is used with a "parallel-series" RF connection arrangement. That is, controller 550 and reader 500 operate the antenna within a rack, with the RF and digital communication lines branched off (i.e., connected with a multi-drop or "tee" arrangement with each of the branches arranged in parallel) to antennae within racks that are arranged in series or in series-parallel. This configuration allows the RF signal to be switched by the tee switch 560 into a rack or group of bins, or to bypass them altogether. In parallel with the RF connections to rack 531 through one RF cable 507, RF connections may be made in parallel to other racks (not shown) through other cables 507. The tee or multi-drop configuration shown in FIG. 15 may be used to reduce the number of switching elements through which the RF transmission cable passes en route to any given antenna.

In FIG. 15, a portion of the control cable 553 that extends beyond rack 531, and a portion of the RF cable 508 between secondary controllers are shown outside of the rack. However, as would be recognized by those skilled in the art, these extended portions of the cables may also be contained within the rack. Additional extended control cable portions 553 may be used to connect to more racks.

The item information data collected by the reader units 500 is transmitted to an inventory control processing unit 580. The inventory control processing unit 580 is typically configured to receive item information from the intelligent stations or racks 531, etc. The inventory control processing unit 580 is typically connected to the intelligent stations over an electronic network 570 and is also associated with an appropriate data store 590 that stores inventory related data including reference tables and also program code and configuration information relevant to inventory control or warehousing. The inventory control processing unit 580 is also programmed and configured to perform inventory control functions that are well known to those skilled in the art. For example, some of the functions performed by an inventory control (or warehousing) unit include: storing and tracking quantities of inventoried items on hand, daily movements or sales of various items, tracking positions or locations of various items, etc.

In operation, the inventory control system would determine item information from the intelligent stations (531, etc.) that are connected to the inventory control processing unit 580 through an electronic network 570. In one embodiment, the various intelligent stations 531, etc. would be under the control of inventory control processing unit 580 that would determine when the reader units 500 under control of controller 550 would poll the antennae 220, 240 to determine item information of items to be inventoried. In an alternate embodiment, the controller(s) 550 may be programmed to periodically poll the connected multiple antennae for item information and then transmit the determined item information to the inventory control processing unit using a reverse "push" model of data transmission. In a further embodiment, the polling and data transmission of item information by the controller 550 may be event driven, for example, triggered by a periodic replenishment of inventoried items on the intelligent shelves. In each case, the controller 550 would selectively energize the multiple antennae connected to reader 500 to determine item information from the RFID tags associated with the items to be inventoried.

Once the item information is received from the reader units 500 of the intelligent stations 531, etc., the inventory control processing unit 580 processes the received item information using, for example, programmed logic, code, and data at the inventory control processing unit 580 and at the associated data store 590. The processed item information is then typically stored at the data store 590 for future use in the inventory control system and method of the invention.

While preferred embodiments of the invention have been described and illustrated, it should be apparent that many modifications to the embodiments and implementations of the invention can be made without departing from the spirit or scope of the invention. Although embodiments have been described in connection with the use of a bin structure, it should be readily apparent that any structure that may be used in selling, marketing, promoting, displaying, presenting, providing, retaining, securing, storing, or otherwise supporting an item or product, may be used in implementing embodiments of the invention.

Although specific circuitry, components, or modules (e.g., tuning circuit 206-207, tee switch 560, impedance matching components 501, 502, RF switch, etc.) may be disclosed herein in connection with exemplary embodiments of the invention, it should be readily apparent that any other structural or functionally equivalent circuit(s), component(s) or module(s) may be utilized in implementing the various embodiments of the invention.

The modules described herein, particularly those illustrated or inherent in, or apparent from the instant disclosure, as physically separated components, may be omitted, combined or further separated into a variety of different components sharing different resources as required for the particular implementation of the embodiments disclosed (or apparent from the teachings herein). The modules described herein may, where appropriate, (e.g., reader 500, primary controller 550, inventory control processing unit 580, data store 590, etc.) be one or more hardware, software, or hybrid components residing in (or distributed among) one or more local and/or remote computer or other processing systems. Although such modules may be shown or described herein as physically separated components (e.g., data store 590, inventory processing unit 580, controller 550, reader 500, secondary controller 520, etc.), it should be readily apparent that the modules may be omitted, combined or further separated into a variety of different components, sharing different resources (including processing units, memory, clock devices, software routines, etc.) as required for the particular implementation of the embodiments disclosed (or apparent from the teachings herein). Indeed, even a single general purpose computer (or other processor-controlled device), whether connected directly to antennas 220, 240, tuning circuits 206, 207, racks 531, or connected through a network 570 executing a program stored on an article of manufacture (e.g., recording medium such as a CD-ROM, DVD-ROM, memory cartridge, etc.) to produce the functionality referred to herein, may be utilized to implement the illustrated embodiments.

One skilled in the art would recognize that inventory control processing unit 580 could be implemented on a general purpose computer system connected to an electronic network 570, such as a computer network. The computer network can also be a public network, such as the Internet or Metropolitan Area Network (MAN), or other private network, such as a corporate Local Area Network (LAN) or Wide Area Network (WAN), Bluetooth, or even a virtual private network. A computer system includes a central processing unit (CPU) connected to a system memory. The system memory typically contains an operating system, a BIOS driver, and application programs. In addition, the computer system contains input devices such as a mouse and a keyboard, and output devices such as a printer and a display monitor.

The computer system generally includes a communications interface, such as an Ethernet card, to communicate to the electronic network 570. Other computer systems may also be connected to the electronic network 570. One skilled in the art would recognize that the above system describes the typical components of a computer system connected to an electronic network. It should be appreciated that many other similar configurations are within the abilities of one skilled in the art and all of these configurations could be used with the methods and systems of the invention. Furthermore, it should be recognized that the computer system and network disclosed herein can be programmed and configured as an inventory control processing unit to perform inventory control related functions that are well known to those skilled in the art.

In addition, one skilled in the art would recognize that the "computer" implemented invention described herein may include components that are not computers per se, but also include devices such as Internet appliances and Programmable Logic Controllers (PLCs) that may be used to provide one or more of the functionalities discussed herein. Furthermore, while "electronic" networks are generically used to refer to the communications network connecting the processing sites of the invention, one skilled in the art would recognize that such networks could be implemented using optical or other equivalent technologies. Likewise, it is also to be understood that the invention utilizes known security measures for transmission of electronic data across networks. Therefore, encryption, authentication, verification, and other security measures for transmission of electronic data across both public and private networks are provided, where necessary, using techniques that are well known to those skilled in the art.

It is to be understood therefore that the invention is not limited to the particular embodiments disclosed (or apparent from the disclosure) herein, but only limited by the claims appended hereto.

What is claimed as new and desired to be protected by Letters Patent of the United States is:

1. A Radio Frequency Identification (RFID) system comprising: at least one non-planar RFID tag associated with an item; a first reader antenna; a second reader antenna; and a container for storing a plurality of items, wherein said first reader antenna is in the form of a loop substantially surrounding a volume of the container; and wherein said second reader antenna is in the form of a loop in a plane parallel with one side of the container.

2. The Radio Frequency Identification (RFID) system as recited in claim 1, wherein said second reader antenna is attached to the one side of the container.

3. The Radio Frequency Identification (RFID) system as recited in claim 1, wherein said container includes a form factor for forcing the item associated with said at least one non-planar tag into a specific orientation relative to at least one of said first and second reader antennae.

4. The Radio Frequency Identification (MD) system as recited in claim 1, wherein said container includes an inner shell that is transparent to RF energy, and an outer shell that blocks RF energy.

5. The Radio Frequency Identification (RFID) system as recited in claim 1, wherein said at least one non-planar RFID tag is affixed to a bottle having a cylindrical shape.

6. The Radio Frequency Identification (RFID) system as recited in claim 1, further comprising a plurality of containers having multiple reader antennas for reading RFID tags affixed to planar and non-planar prescription medicine items.

7. A Radio Frequency Identification (RFID) system comprising: at least one planar REID tag associated with an item; a first reader antenna; a second reader antenna; and a container for storing a plurality of items, wherein said first reader antenna is in the form of a loop substantially surrounding a volume of the container; and wherein said second reader antenna is in the form of a loop in a plane parallel with one side of the container.

8. The Radio Frequency Identification (RFID) system as recited in claim 7, wherein said container includes a form factor for forcing the item associated with said at least one planar tag into a specific orientation relative to at least one of said first and second reader antennae.

9. The Radio Frequency Identification (RFID) system as recited in claim 7, wherein said at least one planar RFID tag is affixed to a bottle having a cylindrical shape.

* * * * *